(12) United States Patent
Rahn

(10) Patent No.: US 6,822,205 B2
(45) Date of Patent: Nov. 23, 2004

(54) METHOD FOR PRODUCING MULTILAYER METAL COMPOSITE TUBES

(75) Inventor: Horst Rahn, Hassfurt (DE)

(73) Assignee: Uponor Innovation AB, Fristad (SE)

( * ) Notice: Subject to any disclaimer, the term of this patent is extended or adjusted under 35 U.S.C. 154(b) by 46 days.

(21) Appl. No.: 10/258,665

(22) PCT Filed: Apr. 24, 2001

(86) PCT No.: PCT/DE01/01562

§ 371 (c)(1),
(2), (4) Date: Oct. 25, 2002

(87) PCT Pub. No.: WO01/85430

PCT Pub. Date: Nov. 15, 2001

(65) Prior Publication Data

US 2003/0102302 A1 Jun. 5, 2003

(30) Foreign Application Priority Data

May 10, 2000 (DE) .......................... 100 22 823

(51) Int. Cl.[7] .................... H05B 6/02; B23K 13/01
(52) U.S. Cl. .............. 219/609; 219/612; 219/60.2; 219/61.2; 29/460; 156/203
(58) Field of Search .................. 219/607, 609, 219/612, 60.2, 59.1, 61.2, 121.63; 29/460, 469.5; 156/466, 203

(56) References Cited

U.S. PATENT DOCUMENTS

| 4,999,903 A | * | 3/1991 | Bujes ..................... 29/469.5 |
| 5,152,323 A | * | 10/1992 | Shotts et al. ............... 138/151 |
| 5,867,883 A | * | 2/1999 | Iorio et al. .................. 29/460 |

FOREIGN PATENT DOCUMENTS

| DE | 30 16 134 | * | 10/1981 |
| DE | DE 38 42 865 C2 | | 7/1989 |
| DE | 43 23 838 | * | 9/1995 |
| DE | 195 36 698 | * | 9/1996 |
| EP | 0 353 977 | * | 2/1990 |
| EP | 0 581 208 | * | 2/1994 |
| EP | 0 920 972 | * | 6/1999 |
| FR | 2 434 326 | * | 3/1980 |
| JP | 3-77714 | * | 4/1991 |
| WO | WO 88/03084 | * | 5/1988 |

* cited by examiner

Primary Examiner—Philip H. Leung
(74) Attorney, Agent, or Firm—Bachman & LaPointe, P.C.

(57) ABSTRACT

A process for the production of multi-layer metal composite tubes (10), wherein a metal strip is shaped to form a tube (16) and butt-welded along its two longitudinal edges. A plastic inner layer (12) is applied by extrusion in firmly adhering manner to the inside (12) of the metal tube (16) and a plastic outer layer (14) is applied by extrusion in firmly adhering manner to the outside (26) of the metal tube (16).

5 Claims, 1 Drawing Sheet

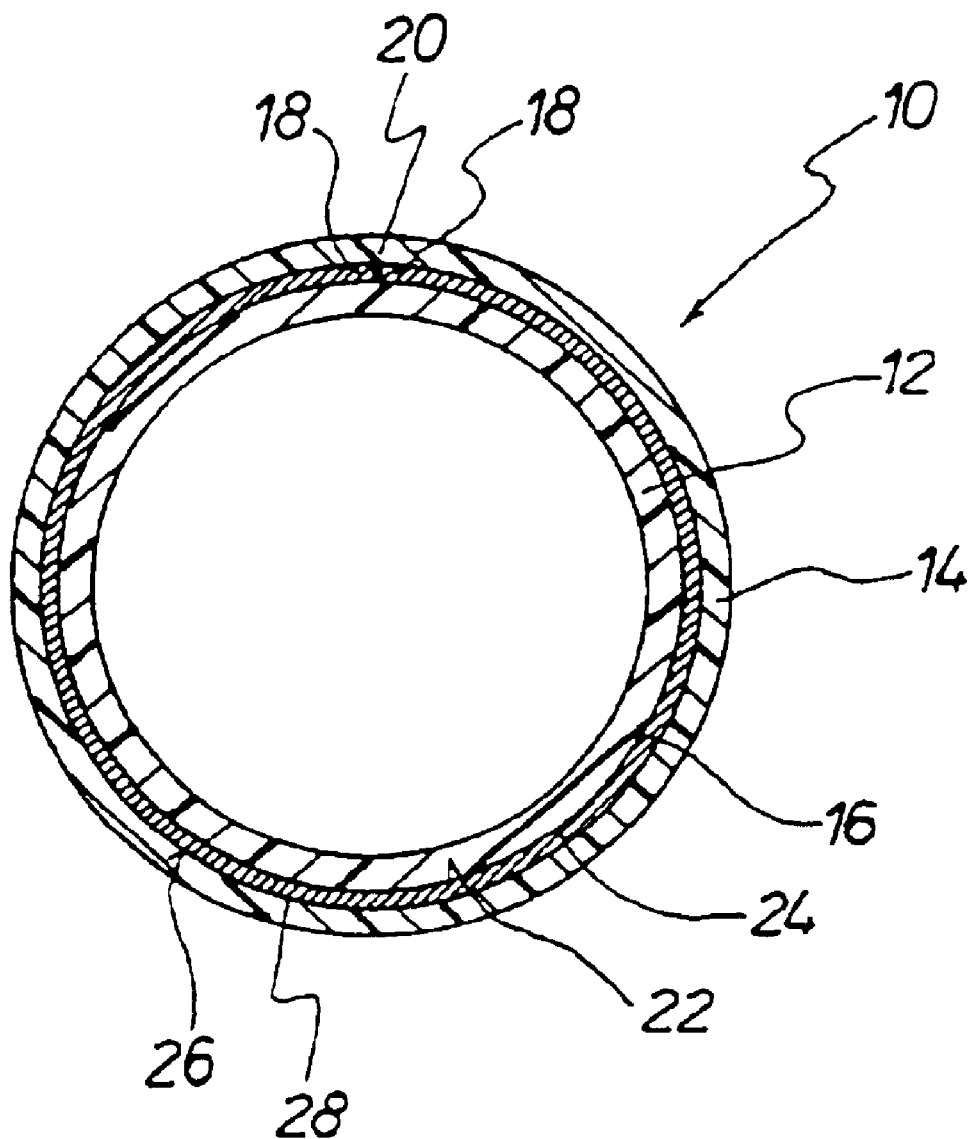

METHOD FOR PRODUCING MULTILAYER METAL COMPOSITE TUBES

This application is a 371 of PCT/DE01/01562 filed Apr. 24, 2001.

BACKGROUND OF THE INVENTION

The invention concerns a process for the production of multi-layer metal composite tubes, wherein a metal strip is shaped to form a tube and welded along its two longitudinal edges, and wherein a plastic inner layer is applied by extrusion at the inside of the metal tube and a plastic outer layer is applied by extrusion at the outside of the metal tube.

Such processes are described in DE 30 16 134 A1, WO 88/03084 A1, EP 0 353 977 A2, EP 0 581 208 A1 or EP 0 920 972 A1. All those known processes involve shaping the metal strip to form a tube, with the two longitudinal edges of the metal strip which has been converted into tube form overlapping. The mutually overlapping longitudinal edges are welded. After the operation of welding the mutually overlapping longitudinal edges, the plastic inner layer is then fixedly applied at the inside of the metal tube and the plastic outer layer is fixedly applied at the outside of the metal tube. For that purpose, a respective bonding agent is extruded with each of the plastic inner layer and the plastic outer layer. The plastic materials used for the inner and outer layers are cross-linked or non-cross-linked plastic materials.

Multi-layer metal composite tubes with welded, mutually overlapping longitudinal edges suffer from the deficiency, in particular in the case of relatively large diametral dimensions with which the wall thickness or gauge of the metal tube correspondingly increases, that the mutually overlapping longitudinal edges become noticeable as a consequence of the wall thickness involved—which is insignificant in the case of composite tubes of small diameter and correspondingly thin metal strips or tubes.

The German journal "Werkstatt+Montagepraxis", Dipl.—Ing. Horst Rahn: "Rohrleitungen aus Kunststoff und Metall in der Sanitär—und Heizungstechnik", pages 30 to 36, September/October 1993, besides that above-mentioned process with mutually overlapping longitudinal edges of the metal strip which is shaped to form the tube, also describes what is known as the Swiss process which comprises firstly producing an inner plastic tube on which is arranged a butt-welded metal or aluminium tube. With that process, it is necessary for the tube which is butt-welded at its two longitudinal edges to be of an inside diameter which is slightly larger than the outside diameter of the plastic inner tube, in order to be able to push the metal tube onto the plastic inner tube. After the metal tube has been pushed onto the plastic inner tube, it is necessary for the metal tube to be calibrated down to the size of the plastic inner tube. Thereafter, the metal or aluminium tube is coated by extrusion with an outer plastic sheathing. In order reliably to be able to implement butt-welding however, it is necessary for the metal tube to be of a given minimum wall thickness. That is frequently more than twice as thick as the minimum wall thickness when welding the mutually overlapping longitudinal edges of a metal strip which has been shaped to form a tube.

A process for the production of a composite tube which comprises at least two layers, wherein at least one layer comprises plastic material and one layer comprises metal, is also described for example in DE 43 10 272 A1. It is proposed therein that the longitudinal edges of the metal strip which is shaped to form a tube are crimped or flanged up in a profiling tool and the flanged longitudinal edges are then welded with a longitudinal seam welding apparatus. That process is relatively complicated and is scarcely suitable or is not at all suitable for inexpensive mass production.

DE 195 36 698 C1 and DE 44 04 492 A1 disclose processes for the production of multi-layer metal composite tubes, wherein a metal strip is shaped to form a tube and is welded along its two longitudinal edges. In that procedure, in accordance with DE 195 36 698 C1, a prefabricated plastic inner tube is applied substantially flush to the metal tube. In that case therefore a prefabricated plastic inner tube is combined with a metal strip which is shaped to form a tube. That represents a considerable amount of apparatus complication and expenditure. In addition, in that procedure, prior to the longitudinal seam welding operation, at the edges which are opposite to each other at the longitudinal seam, the metal tube is profiled outwardly inclinedly or arcuately or in a step configuration, so that an air gap remains between the edges and the outside surface of the prefabricated plastic inner tube. That air gap is required there in order to avoid the prefabricated plastic inner tube being adversely affected during the longitudinal seam welding operation. That profiling of the longitudinal edges of the metal strip also represents an expenditure which cannot be disregarded. Insofar as that longitudinal profiling does not in any case disappear in the longitudinal seam welding operation, that known process also requires the profiled longitudinal edges to be shaped to bring them back into the plane of the prefabricated outer tube. That also represents a complication and expenditure which is not to be disregarded.

DE 44 04 492 A1 provides combining a prefabricated plastic inner tube with a metal tube, wherein a metal foil with mutually overlapping edges is applied to the prefabricated plastic inner tube. The mutually overlapping edges are welded by means of a laser. This known process of the last-mentioned kind therefore not only involves using a prefabricated plastic inner tube, but in addition it involves producing only a metal tube with mutually overlapping longitudinal edges and welding same along the longitudinal edges.

It is an object of the present invention to utilise the advantages of a metal tube with mutually overlapping welded longitudinal edges, with a small metal tube wall thickness and with corresponding flexibility or reduced flexural stiffness, without an overlap making itself annoyingly apparent.

SUMMARY OF THE INVENTION

In accordance with the invention, the foregoing object is attained by the process for the production of multi-layer metal composite tubes, wherein the metal strip is shaped to form a tube in such a way that the two longitudinal edges of the metal strip which is shaped to form the tube adjoin each other in butting relationship without a change in diameter and are butt-welded, wherein immediately after the longitudinal butt-welding of the tube the plastic inner layer and the plastic outer layer are extruded onto the tube. In that respect it has proven to be advantageous if the two longitudinal edges are welded by means of a laser welding apparatus. Another possible option provides that the two longitudinal edges are welded by means of an electrode welding apparatus, by means of an induction welding apparatus or by means of a flame welding apparatus.

The fact that, with the process according to the invention, the two longitudinal edges of the metal tube are butt-welded together, affords the advantage that the longitudinal edges of the metal strip which is shaped to form the tube do not make themselves in any way disturbingly noticeable.

BRIEF DESCRIPTION OF THE DRAWINGS

An embodiment of a multi-layer metal composite tube produced by the process according to the invention is described hereinafter and shown in the drawing FIGURE, although not true to scale.

DETAILED DESCRIPTION

The FIGURE is a view in cross-section through a multi-layer metal composite tube 10 having a plastic inner layer 12, a plastic outer layer 14 and a metal tube 16 disposed between them.

The procedure for production of the multi-layer metal composite tube 10 is as follows:

In a first working step, a metal strip is shaped to form a tube and is butt-welded along its two longitudinal edges 18. That butt-welded join is identified by reference numeral 20. After the step of butt-welding the longitudinal edges 18 of the metal strip which has been shaped to form the metal tube 16, a bonding agent layer 24 and the plastic inner layer 12 are applied by extrusion in firmly adhering manner to the inside 22 of the metal tube 16, and a bonding agent layer 28 and the plastic outer layer 14 are applied by extrusion in firmly adhering manner to the outside 26 of the metal tube 16. The process according to the invention does not involve an operation for calibration of the butt-welded metal tube 16 down to the size of an all ready finished, inner plastic tube 12, as is hitherto the conventional practice in the case of composite tubes with butt-welded metal tubes.

The process according to the invention can be carried into effect for example in an installation as is described in PCT application PCT/DE 99/00224, in which case however the longitudinal edges 18 of the metal strip which is shaped to form the metal tube 16 do not overlap, which means that the shaping apparatus for converting the metal strip into the shape of the metal tube is suitably modified. The same applies in regard to the welding apparatus because it is not overlapping longitudinal edges 18 that are welded, but rather butt-welding of the longitudinal edges 18 of the metal strip which has been shaped to form the metal tube is effected. In other respects, the installation can be of the same design configuration as that described in above-mentioned PCT/DE 99/00224, in which respect it is also possible to extend the production line length from the previous value of for example about 27 m to up to 100 m.

What is claimed is:

1. A process for the production of multi-layer metal composite tubes, comprising the steps of:

shaping a metal strip into a tube having two abutting longitudinal edges and a diameter;

longitudinal butt-welding the abutting longitudinal edges to form a tube having an inside surface and an outside surface without changing the diameter of the tube; and extending an inner plastic layer into the inside surface of the tube and an outer plastic layer into the outside surface of the tube, wherein the inner plastic layer is extruded onto the inside surface of the tube immediately after the longitudinal butt welding.

2. A process according to claim 1, including welding the longitudinal edges by means of a laser welding apparatus.

3. A process according to claim 1 including welding the longitudinal edges by means of an electrode welding apparatus.

4. A process according to claim 1 including welding the longitudinal edges by means of an induction welding apparatus.

5. A process according to claim 1 including welding the longitudinal edges by means of a flame welding apparatus.

* * * * *

(12) EX PARTE REEXAMINATION CERTIFICATE (9349th)
United States Patent
Rahn

(10) Number: US 6,822,205 C1
(45) Certificate Issued: Oct. 8, 2012

(54) METHOD FOR PRODUCING MULTILAYER METAL COMPOSITE TUBES

(75) Inventor: Horst Rahn, Hassfurt (DE)

(73) Assignee: Uponor Innovation AB, Fristad (SE)

Reexamination Request:
No. 90/012,139, Feb. 14, 2012

Reexamination Certificate for:
Patent No.: 6,822,205
Issued: Nov. 23, 2004
Appl. No.: 10/258,665
Filed: Oct. 25, 2002

(21) Appl. No.: 90/012,139

(22) PCT Filed: Apr. 24, 2001

(86) PCT No.: PCT/DE01/01562
§ 371 (c)(1),
(2), (4) Date: Oct. 25, 2002

(87) PCT Pub. No.: WO01/85430
PCT Pub. Date: Nov. 15, 2001

(51) Int. Cl.
*H05B 6/02* (2006.01)
*B23K 13/01* (2006.01)

(52) U.S. Cl. ...... 219/609; 219/612; 219/60.2; 219/61.2; 29/460; 156/203

(58) Field of Classification Search ................. None
See application file for complete search history.

(56) References Cited

To view the complete listing of prior art documents cited during the proceeding for Reexamination Control Number 90/012,139, please refer to the USPTO's public Patent Application Information Retrieval (PAIR) system under the Display References tab.

*Primary Examiner* — William Doerrler

(57) ABSTRACT

A process for the production of multi-layer metal composite tubes (10), wherein a metal strip is shaped to form a tube (16) and butt-welded along its two longitudinal edges. A plastic inner layer (12) is applied by extrusion in firmly adhering manner to the inside (12) of the metal tube (16) and a plastic outer layer (14) is applied by extrusion in firmly adhering manner to the outside (26) of the metal tube (16).

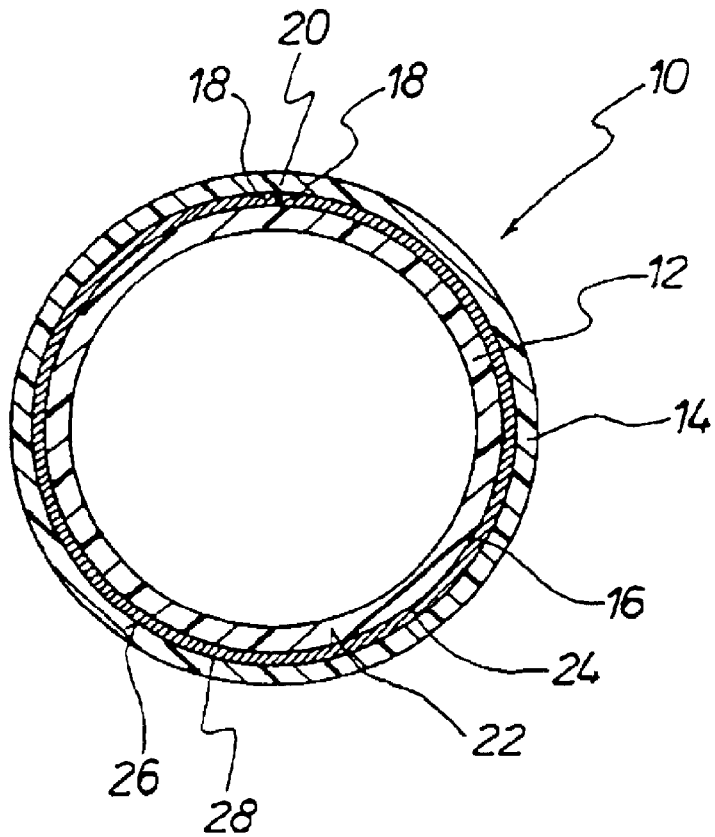

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5 is confirmed.

New claims 6-18 are added and determined to be patentable.

6. *A method for producing a multi-layer metal composite tube, said method comprising:*
   *shaping a metal strip into a metal tube having two abutting longitudinal edges and a diameter, said tube having a first diameter;*
   *butt-welding the abutting longitudinal edges to form a metal tube having an inside surface and an outside surface, said metal tube having a second diameter, said second diameter and said first diameter being equal; and*
   *extruding a plastic inner layer and an inner bonding agent layer into the inside surface of the metal tube, and*
   *extruding a plastic outer layer and an outer bonding agent layer over the outside surface of the metal tube.*

7. *The method of claim 6, wherein the inner plastic layer is extruded onto the inside surface of the tube immediately after the longitudinal butt welding.*

8. *The method of claim 6, wherein butt-welding abutting longitudinal edges comprises butt-welding the longitudinal edges using a laser welding apparatus.*

9. *The method of claim 6, wherein butt-welding abutting longitudinal edges comprises welding the longitudinal edges using an electrode welding apparatus.*

10. *The method of claim 6, wherein butt-welding abutting longitudinal edges comprises welding the longitudinal edges using an induction welding apparatus.*

11. *The method of claim 6, wherein butt-welding abutting longitudinal edges comprises welding the longitudinal edges using a flame welding apparatus.*

12. *The method of claim 6, wherein extruding a plastic inner layer and an inner bonding agent layer into the inside surface of the tube comprises extruding a plastic inner layer and an inner bonding agent layer into the inside surface of an un-calibrated tube.*

13. *A method for producing a multi-layer metal composite tube, said method comprising:*
    *shaping a solid metal strip into a tube having two abutting longitudinal edges and a diameter;*
    *longitudinal butt-welding the abutting longitudinal edges to form a tube having an inside surface and an outside surface without changing the diameter of the tube; and*
    *extruding an inner plastic layer into the inside surface of the tube and an outer plastic layer into the outside surface of the tube,*
    *wherein the inner plastic layer is extruded onto the inside surface of the tube immediately after the longitudinal butt welding.*

14. *The method of claim 13, further wherein extruding comprises extruding a bonding agent layer over said inside surface and a bonding agent layer over said outside surface.*

15. *The method of claim 13, wherein butt-welding abutting longitudinal edges comprises butt-welding the longitudinal edges using a laser welding apparatus.*

16. *The method of claim 13, wherein butt-welding abutting longitudinal edges comprises welding the longitudinal edges using an electrode welding apparatus.*

17. *The method of claim 13, wherein butt-welding abutting longitudinal edges comprises welding the longitudinal edges using an induction welding apparatus.*

18. *The method of claim 13, wherein butt-welding abutting longitudinal edges comprises welding the longitudinal edges using a flame welding apparatus.*

* * * * *